(12) United States Patent
Jones et al.

(10) Patent No.: US 12,257,763 B2
(45) Date of Patent: Mar. 25, 2025

(54) WOVEN STRUCTURE, METHOD AND APPARATUS FOR A FLANGED COMPOSITE COMPONENT

(71) Applicant: ROLLS-ROYCE PLC, London (GB)

(72) Inventors: Christopher D Jones, Bristol (GB); Robert C Backhouse, Wells (GB); Ian Buck, Loughborough (GB); Sarvesh Dhiman, Loughborough (GB)

(73) Assignee: ROLLS-ROYCE plc, London (GB)

( * ) Notice: Subject to any disclaimer, the term of this patent is extended or adjusted under 35 U.S.C. 154(b) by 153 days.

(21) Appl. No.: 18/215,594

(22) Filed: Jun. 28, 2023

(65) Prior Publication Data

US 2024/0017475 A1   Jan. 18, 2024

(30) Foreign Application Priority Data

Jul. 14, 2022 (GB) ..................... 2210346

(51) Int. Cl.

| | | |
|---|---|---|
| *B29B 11/16* | (2006.01) | |
| *B29C 53/56* | (2006.01) | |
| *B29C 53/80* | (2006.01) | |
| *B29C 53/82* | (2006.01) | |
| *D03D 3/04* | (2006.01) | |
| *D03D 3/08* | (2006.01) | |

(52) U.S. Cl.
CPC ........ *B29C 53/562* (2013.01); *B29C 53/8016* (2013.01); *B29C 53/821* (2013.01); *D03D 3/04* (2013.01); *D03D 3/08* (2013.01)

(58) Field of Classification Search
CPC ....................................................... B29B 11/16
See application file for complete search history.

(56) References Cited

U.S. PATENT DOCUMENTS

| | | |
|---|---|---|
| 4,194,540 A | 3/1980 | Reynolds |
| 4,741,873 A | 5/1988 | Fischer et al. |
| 5,360,503 A | 11/1994 | Coffy |
| | (Continued) | |

FOREIGN PATENT DOCUMENTS

| | | |
|---|---|---|
| CN | 111347581 A | 6/2020 |
| EP | 0 302 989 A2 | 2/1989 |
| | (Continued) | |

OTHER PUBLICATIONS

U.S. Appl. No. 18/215,567, filed Jun. 28, 2023 in the name of Christopher D Jones et al.
(Continued)

*Primary Examiner* — Jeffry H Aftergut
(74) *Attorney, Agent, or Firm* — Oliff PLC

(57) ABSTRACT

An apparatus for manufacturing an annular or semi-annular composite component having a circumferentially-extending base and a flange, the apparatus including: a loom for weaving a woven preform of fibre reinforcement material for the composite component; a rotatable mandrel configured to receive and draw the woven preform through the loom for weaving; and a guide disposed between the loom and the rotatable mandrel, configured so that a woven preform drawn by the rotatable mandrel along a guide path under tension engages the guide to transition to a flanged profile at a lip of the guide before being received on the mandrel.

8 Claims, 5 Drawing Sheets

(56) References Cited

U.S. PATENT DOCUMENTS

| | | | | |
|---|---|---|---|---|
| 5,368,076 A | * | 11/1994 | Curzio | D03D 3/00 |
| | | | | 139/384 R |
| 7,361,618 B2 | | 4/2008 | Homma et al. | |
| 10,767,288 B2 | * | 9/2020 | Provost | B29B 11/16 |
| 2008/0206048 A1 | * | 8/2008 | Coupe | F01D 21/045 |
| | | | | 415/200 |
| 2014/0110063 A1 | * | 4/2014 | Mathon | B32B 37/0046 |
| | | | | 156/580 |
| 2015/0167208 A1 | | 6/2015 | Bischoff | |
| 2015/0174833 A1 | * | 6/2015 | Desjoyeaux | B29C 70/021 |
| | | | | 425/112 |
| 2015/0274311 A1 | | 10/2015 | Briand | |
| 2019/0030840 A1 | * | 1/2019 | Camus | F02C 7/04 |
| 2019/0062962 A1 | | 2/2019 | Hellot et al. | |
| 2020/0206978 A1 | | 7/2020 | Six et al. | |
| 2021/0370620 A1 | | 12/2021 | Kuntz | |

FOREIGN PATENT DOCUMENTS

| | | |
|---|---|---|
| EP | 0 539 996 A1 | 5/1993 |
| EP | 0 909 845 A1 | 4/1999 |
| EP | 1 357 211 A1 | 10/2003 |
| EP | 1 464 743 A1 | 10/2004 |
| EP | 2 662 480 A1 | 11/2013 |
| EP | 3 006 489 A1 | 4/2016 |
| EP | 3 288 746 A1 | 3/2018 |
| EP | 4 079 470 A1 | 10/2022 |
| FR | 3 033 279 A1 | 9/2016 |
| FR | 3 054 842 A1 | 2/2018 |
| FR | 3 066 429 A1 | 11/2018 |
| GB | 1190214 A | 4/1970 |
| JP | 2002-138344 A | 5/2002 |
| JP | 2006-233341 A | 9/2006 |
| JP | 5002895 B2 | 8/2012 |
| JP | 2020-100922 A | 7/2020 |
| JP | 2022-054847 A | 4/2022 |
| KR | 10-2009-0102565 A | 9/2009 |
| WO | 2016/174401 A1 | 11/2016 |
| WO | 2019/027385 A2 | 2/2019 |

OTHER PUBLICATIONS

U.S. Appl. No. 18/215,558, filed Jun. 28, 2023 in the name of Christopher D Jones et al.
Jan. 13, 2023 combined Search and Examination Report issued in British Patent Application No. 2210348.5.
Jan. 13, 2023 combined Search and Examination Report issued in British Patent Application No. 2210347.7.
Jan. 16, 2023 combined Search and Examination Report issued in British Patent Application No. 2210346.9.
Jun. 28, 2023 combined Examination and Search Report issued in British Patent Application No. 2210347.7.
Jun. 30, 2023 combined Search and Examination Report issued in British Patent Application No. 2210348.5.
Nov. 23, 2023 partial Search Report issued in European Patent Application No. 23180708.2.
Dec. 7, 2023 extended Search Report issued in European Patent Application No. 23180707.4.
Dec. 7, 2023 extended Search Report issued in European Patent Application No. 23180705.8.

* cited by examiner

WOVEN STRUCTURE, METHOD AND APPARATUS FOR A FLANGED COMPOSITE COMPONENT

CROSS-REFERENCE TO RELATED APPLICATIONS

This specification is based upon and claims the benefit of priority from United Kingdom patent application number GB 2210346.9 filed on Jul. 14th 2022, the entire contents of which is incorporated herein by reference.

BACKGROUND

Field of the Disclosure

The disclosure concerns an annular or semi annular composite component having a flange, together with a woven structure, method and apparatus for manufacturing such a composite component.

Description of the Related Art

It is known to use composite materials comprising a matrix reinforced with fibre reinforcement material such as carbon fibre for components to provide a desirable combination of properties, such as strength and low weight.

It is known to form flanged rings from composite materials, for example by providing a lay-up of unidirectional plies of fibre reinforcement material over a lay-up surface which either defines a flanged shape, or which can change configuration during a forming process to deform a preform to form the flange (as disclosed in EP3288746, for example). Plies of fibre reinforcement material may be applied by such methods as automatic tape laying (ATL) or automatic fibre placement (AFP). Unidirectional plies of fibre reinforcement material may permit relative displacement of fibres (e.g. of tows) during such forming processes to compensate for an increasing circumferential dimension of the flange along the radial extent of the flange. Otherwise, when directly applied in-situ on a flanged lay-up surface, a circumferential spacing between fibres (e.g. of tows) may naturally increase along a radial extent of the flange.

Unidirectional plies of composite material are therefore generally accepted as suitable for forming non-developable profiles. The expression "developable" relates to a surface that can be flatted onto a plane without distortion.

Woven structures of fibre reinforcement material have been proposed for use in the manufacture of composite components, owing to improved properties relating to structural integrity. Unlike unidirectional plies of fibre, woven structures are generally not formed in-situ on a shaped lay-up surface or forming surface. Further, woven structures naturally have tows of fibre-reinforcement extending in orthogonal directions, and as such may be resistant to deformation to non-developable surfaces.

SUMMARY OF THE DISCLOSURE

According to a first aspect there is disclosed an apparatus for manufacturing an annular or semi-annular composite component having a circumferentially-extending base and a flange, the apparatus comprising:
  a loom for weaving a woven preform of fibre reinforcement material for the composite component;
  a rotatable mandrel configured to receive and dray the woven preform through the loom for weaving;
  wherein the rotatable mandrel defines a near net shape profile for the composite component, including:
    a base surface extending circumferentially around a rotation axis of the mandrel for defining a radially inner surface of the base of the composite component;
    a flange surface for defining a surface of the flange of the composite component, the flange surface extending from an edge of the base surface along a direction having a radial component, such that a circumferential dimension of an angular portion of the near net shape profile increases along a radial extent of the flange surface; and
  a guide disposed between the loom and the rotatable mandrel, the guide defining a guide path therebetween for the woven preform, the guide being configured relative to the loom and the rotatable mandrel to engage a first side of the woven preform opposite to a second side to be received on the near net shape profile of the rotatable mandrel;
  wherein the guide is configured so that a woven preform drawn by the rotatable mandrel along the guide path under tension engages the guide to transition to a flanged profile at a lip of the guide before being received on the mandrel.

It may be that the guide has a blended shape between a loom end and the lip at a mandrel end, the blended shape being configured so that the woven preform transitions from a planar profile towards the loom end to a flanged profile at the Hp. It may be that the lip has a profile corresponding to the near net shape profile defined by the rotatable mandrel. It may be that the lip defines an L-shape for forming a composite component with a single flange on one edge of the base, or wherein the lip defines a U-shape for forming a composite component with flanges on each edge of the base.

It may be that there is a tangential path extending from the base surface of the rotatable mandrel to a corresponding base part of the lip of the guide, the tangential path being tangential relative to the base surface of the rotatable mandrel and extending from an application location of the rotatable mandrel for tangentially receiving a woven preform from the guide. It may be that there is a shortest path from the loom to the application location; the guide defines the guide path at a radially inward side of the shortest path relative to the rotation axis of the mandrel; the lip of the guide comprises a flange part which departs from a profile of the base part along a direction having a radially outward component; and the apparatus is configured to draw a woven preform along the guide path so that a flange portion of the woven preform wraps around the flange part towards the shortest path to provide the woven preform with a flanged profile for application to the mandrel.

The apparatus may comprise a warp tow supply configured to supply warp tows to the loom at different rates responsive to different rates at which the respective portions of the woven preform are drawn onto the rotating mandrel. Accordingly, warp tows corresponding to portions of the component having a relatively greater circumferential dimension (e.g. to be received on portions of the near net shape profile of the rotatable mandrel having a relatively greater circumferential dimension) may be drawn from the warp tow supply at a higher rate than warp tows corresponding to portions of the component having a relatively smaller circumferential dimension. For example, a warp tow corresponding to a radially-outer portion of the flange of the component may be drawn onto the mandrel and supplied from the warp tow supply at a higher rate than a warp tow corresponding to the base of the component.

According to a second aspect there is disclosed a method of manufacturing a preform for an annular or semi-annular composite component having a circumferentially-extending base and a flange using an apparatus in accordance with any preceding claim, the method comprising:

rotating the mandrel to draw a woven preform through the loom as it is woven by the loom:

wherein the woven preform transitions to a flanged profile corresponding to the near net shape profile of the rotatable mandrel as it passes over the guide under tension, prior to being received on the rotatable mandrel.

It may be that the woven preform has a warp direction corresponding to the path along which it is drawn from the loom to the rotatable mandrel, and a lateral direction orthogonal to the warp direction and extending across the woven preform and generally parallel with the weft tows at the loom. It may be that drawing the woven preform onto the rotatable mandrel causes a weft tow spacing between circumferentially-adjacent weft tows of the woven preform to vary along the lateral direction downstream of the loom, such that the weft tow spacing is greater at a first lateral portion of the woven preform corresponding to the flange surface of the rotatable mandrel than at a second lateral portion of the woven preform corresponding to the base surface of the rotatable mandrel.

It may be that the woven preform is in accordance with the fourth aspect.

The method may further comprise drawing a first layer of the woven preform onto the rotatable mandrel and drawing a second layer of the woven preform over the first layer, It may be that, between the second layer and the first layer there is a variation in:

a weave property of the weave in the flange region and/or
a lateral dimension of the woven preform; and/or
a lateral location of a boundary between the flange portion and the base portion.

The weave property of the weave in the flange region which differs in the second layer relative to the first layer may be selected from the group consisting of:

a type of weave pattern;
a type of multi-layer weave;
a float number, corresponding to a number of weft tows over which binding warp tows float in the respective weave;
a ratio of binding stacks to warp stacks in a multi-layer weave;
a binding depth of binding warp tows in binding stacks of a multi-layer weave; and
a tow count of binding warp tows in binding stacks of a multi-layer weave.

An apparatus according to the first aspect may further comprise a loom controller configured to control the loom to weave a woven preform in accordance with the fourth aspect.

The loom controller may be configured to control the loom so that, in a method as described herein comprising drawing a first layer of the woven preform onto the rotatable mandrel and drawing a second layer of the woven preform over the first layer, between the second layer and the first layer there is a variation in: a weave property of the weave in the flange region; and/or a lateral dimension of the woven preform; and/or a lateral location of a boundary between the flange portion and the base portion.

According to a third aspect there is disclosed a woven structure of fibre reinforcement material for an annular or semi-annular composite component having a circumferentially-extending base and a flange extending from an edge of the base, the woven structure comprising:

a warp direction extending along the woven structure and corresponding to a circumferential direction of the component;
a weft direction transverse to the warp direction and extending across the woven structure;
a base region corresponding to the base and having a first weave;
a flange region corresponding to the flange and having a second weave different from the first weave; the flange region being adjacent to the base region along the weft direction;
wherein weft tows of the woven structure extend through both the base region and the flange region, and are spaced along the warp direction by a weft tow spacing;
wherein a weave property differs in the second weave relative to the first weave to ease preform expansion of the weft tow spacing in the flange region relative to the base region, the weave property being selected from the group consisting of:
a type of weave pattern;
a type of multi-layer weave;
a float number, corresponding to a number of weft tows over which binding warp tows float in the respective weave;
a ratio of binding stacks to warp stacks in a multi-layer weave;
a binding depth of binding warp tows in binding stacks of a multi-layer weave; and
a tow count of binding warp tows in binding stacks of a multi-layer weave.

The prefix "semi-" in the expression "semi-annular composite component" is intended to mean that the composite component is partly annular, for example extending through an arc of any angular extent, and is not limited to just half of a closed annulus. The expression "to ease preform expansion of the weft tow spacing in the flange region" is intended to mean that the weft tow spacing is permitted to expand in the flange region more readily than in the base region, for example along a path between a loom and a rotatable mandrel.

The expression "warp stack" refers to a portion of the respective weave having a width along the weft direction corresponding to one warp tow, with the or each respective warp tow extending along the warp direction without interlacing with weft tows. The expression "binding stack" refers to a portion of the respective weave having a width along the weft direction corresponding to one warp tow, with the or each respective warp tow interlacing with weft tows to bind them, thereby forming a multi-layer weave. The type of weave pattern may correspond to a two dimensional weave type, and/or may be selected from a group consisting of: a plain weave, a twill weave, a satin weave and a basket weave. The type of multi-layer weave may be a type of through-thickness weave pattern defined by binding warp tows in binding stacks of a multi-layer weave. For example, the type of multi-layer weave may be selected from the group consisting of: a layer-to-layer angle interlock; through-thickness angle interlock; through-thickness orthogonal interlock.

The float number may be a number of weft tows over which binding warp tows float in binding stacks of a multi-layer weave (a warp float number). For example, binding warp tows may float over 4 weft tows (which may be referred to as a 4-harness or 4-satin weave) or over 8 weft tows (which may be referred to as an 8-harness or 8-satin weave)

A multi-layer weave may have a weave pattern corresponding to a two-dimensional weave. For example, a multi-layer weave may have a satin weave pattern in which binding warp tows extend between and/or through multiple layers of the woven structure, but float at an outer surface of the weave. Owing to the arrangement of the binding warp tows, weft tows may also extend over and under binding tows to conform with the weave pattern. Satin, twill, plain and basket weave patterns may be formed. A multi-layer weave may have a plurality of binding warp tows which extend between and/or through multiple layers of the woven structure according to the weave pattern (i.e. at a binding stack of the weave), and (non-binding) warp tows which extend within a single layer of the woven structure (in other words, without crimping passes under and over weft tows in an alternating manner, for example in a warp stack of the weave).

It may be that the first weave has a multi-layer weave type which is a layer-to-layer interlock weave. Additionally or alternatively, it may be that the second weave has a multi-layer weave type which is a through-thickness interlock weave.

The layer-to-layer interlock weave may be an orthogonal interlock weave or an angle interlock weave. The through-thickness interlock weave may be a through-thickness orthogonal interlock weave or a through-thickness angle interlock weave.

It may be that the flange region comprises an inner flange region having the second weave and disposed adjacent to the base region, and an outer flange region adjacent to the inner flange region and corresponding to a radially outer portion of the flange. The outer flange region may have a third weave different from the second weave. It may be that a weave property differs in the third weave relative to the second weave to further ease preform expansion of the weft tow spacing in the outer flange region relative to the inner flange region, the weave property being selected from the group consisting of;

a type of weave pattern;

a type of multi-layer weave;

a float number, corresponding to a number of weft tows over which binding warp tows float in the respective weave;

a ratio of binding stacks to warp stacks in a multi-layer weave;

a binding depth of binding warp tows in binding stacks of a multi-layer weave; and a tow count of binding warp tows in binding stacks of a multi-layer weave.

It may be that a tow weight of warp tows increases in the flange region relative to a tow weight of warp tows in the base region. The tow weight increase may be graduated in the flange region. Increasing the tow weight for warp tows corresponding to radially outer portions of the component, namely the flange and in particular radially-outer portions of the flange, may offset or compensate for a reduced volume fraction of fibre reinforcement material in radially-outer portions of the component that would otherwise occur.

It may be that the woven structure comprises two flange regions on opposing sides of the base region. Each of the flange regions may have any of the features described above with reference to the flange region.

According to a fourth aspect, the woven structure (e.g. according to any statement above in relation to the third aspect) is a preform of fibre reinforcement material for the annular or semi-annular composite component.

According to a fifth aspect there is disclosed an annular or semi-annular composite component comprising the woven structure according to the third aspect and a matrix material, the woven structure and matrix material together forming a base and one or more flanges of the component. The base may extend circumferentially around a central axis of the component. The or each flange may extend from a respective edge of the base along a direction having a radial component, such that a circumferential extent of an angular portion of the flange increases at outwardly advancing radial positions of the flange.

The warp direction may correspond to the circumferential direction and the weft direction may correspond to the axial and/or radial directions.

It may be that an angular portion of the component is defined by a plurality of overlapping layers of the woven structure laid up in a radial direction and not interwoven with each other in the radial direction, including a first layer and a second layer. It may be that a warp tow weight of one or more warp tows in the second layer is greater than a warp tow weight of one or more corresponding warp tows in the first layer. It may be that each overlapping layer of the woven structure comprises a multi-layer weave. It may be that the overlapping layers of the woven structure are defined by respective portions of the same continuous woven structure laid up in a spiral configuration.

It may be that, throughout a circumferential extent of the component, a weft tow spacing between circumferentially-adjacent weft tows is greater at a first location along the weft direction which is in the flange than at a second location along the weft direction in the base.

The composite component may be a semi-annular or annular structural component for a propulsion machine such as a gas turbine engine. For example, the structural component may be a support ring for a set of aerodynamic vanes, or a casing for a fan.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION OF THE DISCLOSURE

Figure 1A:
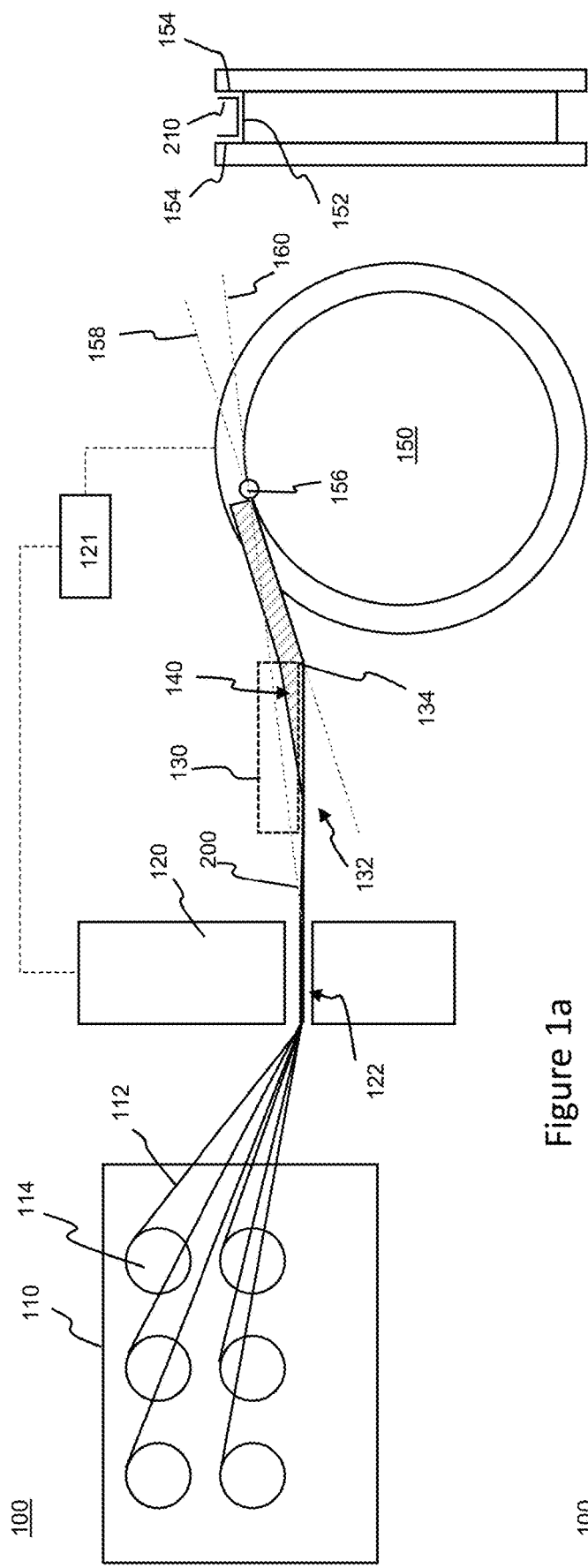
FIGS. 1a-1c schematically show views of an apparatus for manufacturing a composite component.
Figure 1B:
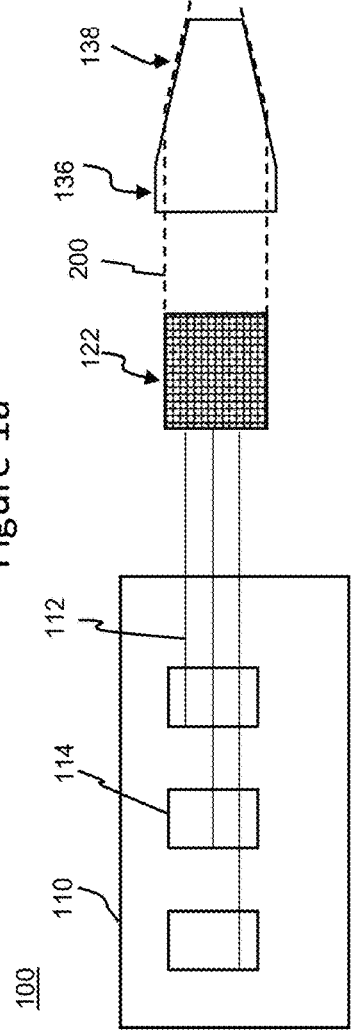
Figure 1C:
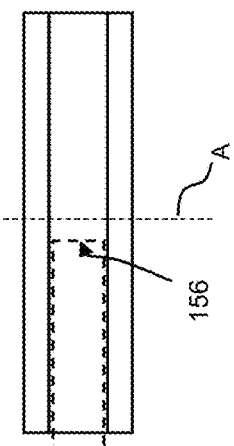

FIGS. 1a-1c show an apparatus 100 for manufacturing a composite component in various views, and may be collectively referred to as FIG. 1. FIG. 1a shows a schematic side view to illustrate a path of fibre-reinforcement material through the apparatus, whereas FIG. 1b schematically shows a plan view to illustrate how the fibre-reinforcement material wraps around sides of a guide for application to a mandrel, and FIG. 1c illustrates a cross-section of the mandrel with the fibre-reinforcement material applied.

The apparatus 100 comprises, in order with respect to the passage of warp tows through the apparatus: a warp tow supply 110, a loom 120, a guide 130 and a rotatable mandrel 150. The warp tow supply 110 is configured to supply warp tows 112 to the loom 120 for weaving with weft tows at a weave location 122 of the loom. The warp tow supply may comprise a plurality of separate tow supply feeds 114 (e.g. separate tow spools on a creel) each configured to independently supply separate warp tows to the weave location 122 of the loom 120.

The loom 120 is configured to weave a woven structure 200 using the warp tows 112 supplied from the warp tow supply 110 and weft tows (not shown) supplied at the loom 120. The loom 120 may be of any suitable type as is known in the art. For complex weaves the loom may be programmable (i.e. configured for computer control) to form woven structures 200 with weave patterns based on computer-readable instructions. Such a loom may be referred to as a computer-controlled jacquard loom. The apparatus 100 comprises a loom controller 121 for controlling the loom 120 to weave the woven structure 200, as will be described in further detail below. As shown in FIG. 1a, the loom controller 121 may be coupled to the mandrel to monitor or control a speed of rotation of the mandrel, in order to ensure that the woven structure 200 is woven at an appropriate rate.

Downstream of the loom 120, the guide 130 defines a guide path 132 for the woven structure 200 between the loom 120 and the mandrel 150. The configuration of the guide 130 can be best described with reference to its orientation with respect to the loom and mandrel.

The mandrel 150 is for forming a semi-annular or annular component. In the example of FIG. 1, the mandrel 150 is a fully-revolved mandrel for forming an annular component having a base and a flange. The woven structure 200 as received from the loom may be referred to herein as woven preform 200 to reflect that it forms an Integral part of the annular component but must be formed to shape and subsequently cured with matrix material (e.g. by a resin transfer moulding (RTM) technique) to form the component. The woven preform in a flanged configuration is shown as received on the rotatable mandrel in FIG. 1c. The mandrel defines a near net shape profile for the composite component, including a base surface 152 extending circumferentially around a rotational axis A of the mandrel for defining a radially inner-surface of the base of the composite component; and a flange surface 154 for defining a surface of the flange of the composite component, the flange surface extending from an edge of the base surface (e.g. an edge at an axial side of the base surface) along a direction having a radial component. Accordingly, a circumferential dimension of an angular portion of the near net shape profile increases along a radial extent of the flange surface. As referred to herein, the expression circumferential dimension is intended to refer to the length of an arc along the circumferential direction, such that for an arcuate component having a variable radius r, the circumferential dimension over any angular portion having an angular extent θ is the product re, which clearly varies in proportion to the respective radius. The flange surface may extend from the base surface along a substantially radial direction (i.e. along a direction primarily having a radial component and a minimal or substantially no axial component, relative to the rotation axis), or may extend along an inclined direction having both radial and axial components.

As will be appreciated by the skilled person, when the circumferential dimension increases in this manner a composite manufacturing technique is constrained in a number of ways. In particular, it can be difficult to utilise fibre reinforcement material extending along the circumferential direction as adjacent tows of such material ideally have different lengths to avoid wrinkling. Accordingly, tows of such material are either applied in separately (e.g. in a tape laying or fibre placement technique), or unidirectional plies extending axially (or with a significant axial component) are used to better conform to the profile.

As shown in FIG. 1, there are two flange surfaces 154 at opposing axial sides of the base surface 152, each configured to define a surface of respective flanges of the composite component. However, in other examples there may be a single flange surface for a component having a single flange.

The expression "near net surface" is a term of the art, and is intended to refer to the mandrel defining a profile which is close to the final of the composite component to be manufactured (e.g. except for relatively minor finishing and machining), such that the reader understands that the action of forming the preform woven structure into the shape of the component is conducted by applying the preform to the mandrel 150.

As the near net shape profile of the mandrel is configured to define a radially inner surface of the base of the composite component, it is implicit that the two sides of the woven preform includes a side to be received on the mandrel (a radially-inner side as received on the mandrel), and an opposing side (a radially-outer side as received on the mandrel). In the following disclosure, the opposing side (the radially-outer as received on the mandrel) is referred to as the first side of the woven preform, and the side to be received on the mandrel (the radially-inner side) is referred to as the second side of the woven preform.

The guide 130 is disposed between the loom 120 and the mandrel 150, and defines the guide path 132 therebetween to engage the first side of the woven preform. The guide 130 is configured so that a woven preform drawn by the rotatable mandrel along the guide path under tension engages the guide to transition to a flanged profile at a lip 134 of the guide before being received on the mandrel. In this example, the lip 134 defines a U-shaped flanged profile corresponding to the profile of the mandrel and of the woven structure as shown on the mandrel in FIG. 1C (reference numeral 210), but in other examples where there is a single flange the lip may define an L-shaped flanged profile accordingly. By guiding the transition to the flanged profile, the preform can be better oriented for application to the mandrel to avoid forming defects such as wrinkling. In particular, the guide can be configured to discharge the preform having a flanged profile substantially corresponding to the profile it is to adopt on the mandrel, such that local tension forces on the preform at an application location of the mandrel (i.e. where the preform engages the mandrel or an underlying layer of the preform as received on the mandrel) have the effect of maintaining the preform taught in its flanged shape for application, rather than causing local changes or transitions in the profile of the preform as it is applied, which may cause wrinkling and other forming defects.

The woven preform is referred to herein as having a longitudinal direction corresponding to the path along which it is discharged from the loom and drawn to the rotatable mandrel, and a lateral direction orthogonal to the longitudinal direction and extending across the woven preform. The longitudinal direction may correspond to a warp direction of the woven preform (i.e. along which warp tows generally extend), and to a circumferential direction of the rotatable mandrel. The lateral direction may generally correspond to a weft direction of the woven preform, while acknowledging that weft tows may depart from a direction that is precisely orthogonal to the longitudinal and/or warp directions.

The lip 134 of the guide 130 is the portion of the guide from which the woven preform is discharged towards the mandrel 150. It is envisaged that in some implementations the portion of the guide which is configured to engage the woven preform may be primarily defined by (e.g. consist of) the lip 134, such that the preform is effectively unsupported or unguided between the loom and the lip and therefore freely transitions to the flanged profile as defined by lip 134.

However, in other examples including the example implementation shown in FIG. 1, the guide 130 defines a guide path 132 which engages the first side of the woven preform upstream of the lip. In the example of FIG. 1, the guide has a blended shape between a loom end (i.e. a side proximal to the loom) and a mandrel end (i.e. a side proximal to the mandrel) which is configured to guide the transition from a planar profile of the preform as discharged from the loom to a flanged profile at the lip 134. For example, the guide 130 may comprise a relatively wide loom end 136 configured so that a full lateral extent of the first surface of the woven preform engages a first surface of the guide 130 at the loom end 136 (e.g. a substantially planar underside surface as shown in FIG. 1), and which tapers towards the mandrel end 138 so that a lateral extent of the first surface decreases and lateral edges of the preform are drawn under tension to wrap around respective edges of the first surface onto side surfaces of the guide 130, as shown at arrow 140.

As will be appreciated by the skilled person, a rotating mandrel draws material onto it along a tangential direction with respect to the application location at which the material engages the respective surface.

As shown in FIG. 1a, there is a tangential path 158 extending form the base surface 152 of the rotatable mandrel 150 to a corresponding base part of the lip 134 of the guide, with the path 158 being tangential relative to the base surface 152 of the rotatable mandrel 150 and extending from the application location 156. There is also a shortest path from the loom 120 (e.g. from the weave location 122 of the loom) to the application location 156—i.e. a theoretical shortest path if there were no intervening components such as the guide. For clarity in the drawing, the shortest path is indicated with reference numeral 160 which extends to the direction of the shortest path (i.e. as extending beyond the end of the shortest path at the application location 156).

The guide 130 defines the guide path 132 at a radially inward side of the shortest path 160 relative to the rotation axis A of the mandrel 150. Accordingly, as the mandrel 150 rotates to draw the woven preform 200, the resultant tension in the woven preform causes it to move towards the shortest path 160 and thereby engage the guide 130 which limits further movement towards the shortest path 160.

The lip 134 of the guide 130 comprises a flange part which departs from a profile of the base part along a direction having a radially outward component. The upstream sides of the guide 130 similarly depart from the profile of the first surface along directions having a radially outward component. Accordingly, tension in the woven preform causes the lateral sides of the preform to wrap up around the sides of the guide 130 and the lip 134 to transition to, and adopt, the flanged profile for application to the mandrel.

Accordingly, each portion of the woven preform may be drawn from the guide onto the mandrel along a substantially tangential direction relative to the respective part of the mandrel, such that there is minimal change in the profile of the woven preform as it moves and is applied onto the mandrel, thereby avoiding forming defects such as wrinkling.

A cross-section of the woven structure 200 as applied onto the mandrel with the flanged profile is shown in FIG. 1c at reference numeral 210. The same cross-section is representative of a composite component comprising the woven structure 200.

Owing to the differential circumferential extents of the near net shape profile of the mandrel along the flange surface(s), the respective warp tows may be drawn onto the mandrel at different rates, causing the respective tow supply feeds to dispense the tows at different rates (e.g. by rotating spools at different rates).

Figure 2:
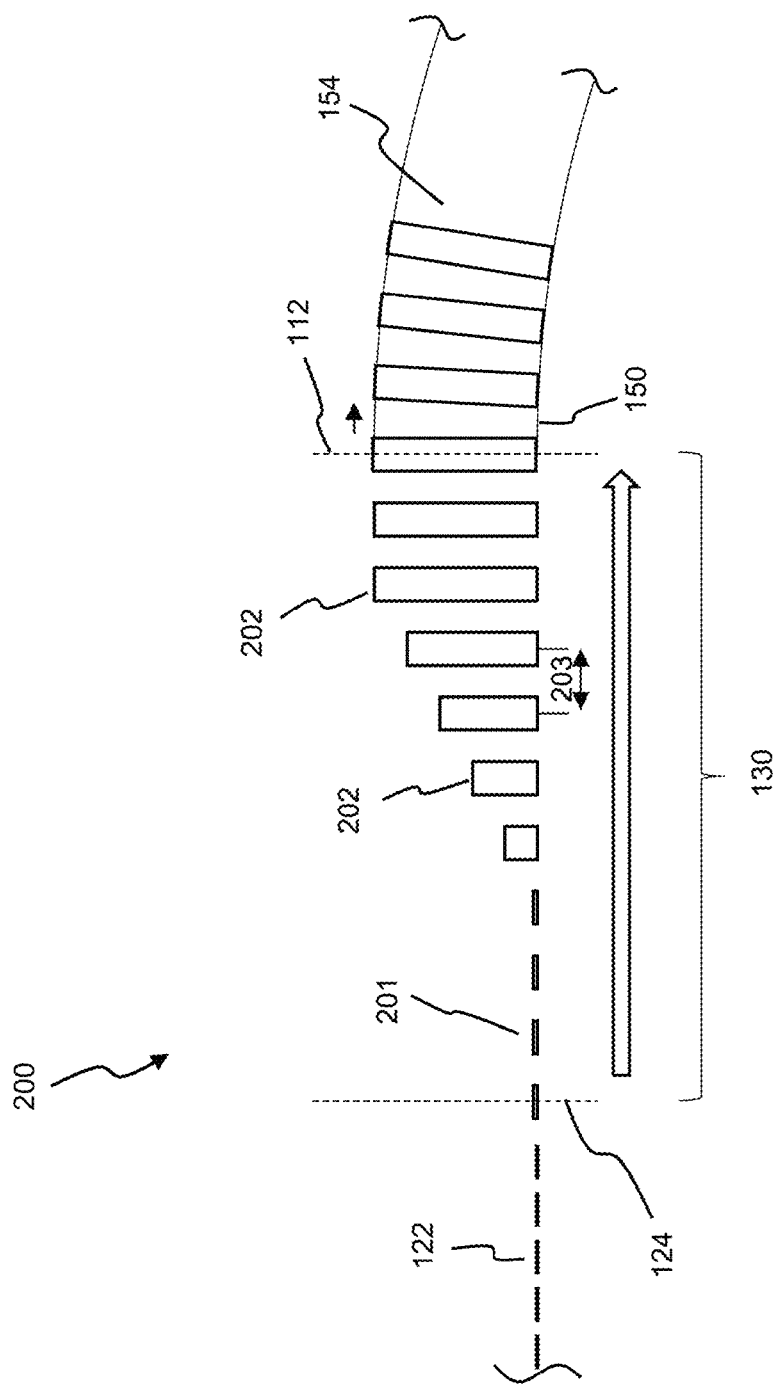
FIG. 2 schematically shows preform expansion of weft tow spacing in a flange region of a woven structure.

FIG. 2 schematically shows weft tows 202 of a flange region of the woven preform 200 as it is drawn from an exit 124 of the weave location 122 of the loom, over the guide 130 and onto the respective flange surface 154 of the mandrel 150. The direction of motion is shown by the block arrow. The drawing represents a simplified schematic snapshot of how the weft tows may be oriented during a process of applying the woven preform on the mandrel 150. Although not shown, it will be appreciated that the weft tows are interwoven with warp tows extending from the loom to the mandrel at multiple lateral positions along the weft tows 202.

As shown in FIG. 2, as the preform 200 exits the loom the weft tows do not depart from a profile of a base region of the preform to define the flange region, as indicated by the zero-height dashes at weft tow locations. As the preform is drawn to wrap around the sides of the guide 130 as described above, increasing lengths of the weft tows 202 transition to the flange region to define the flanged profile of the preform. In advance of being applied to the mandrel 150, the extent of the flange region along the lateral direction of the preform substantially corresponds to the extent to the flange region of the preform as applied onto the mandrel, as shown by the corresponding extents of the weft tows 202 upstream and downstream of the application point 112.

FIG. 2 schematically shows the preform 200 extending along a substantially linear direction (left-to-right in the page) along the guide 130, and then extending circumferentially as applied onto the mandrel 150. Although schematic, this illustrates how the varying circumferential dimension the woven structure as applied on the flange surface 154 of the mandrel causes the woven structure to expand at radially outer locations. For example, as shown in FIG. 2, weft tows extend through both the base region and the flange region and are spaced along the warp direction by a weft tow spacing 203. The weft tow spacing expands in the flange region to accommodate the non-uniform circumferential dimension of the flange, with FIG. 2 illustrating the expanding weft tow spacing at radially outer locations of the preform as applied onto the mandrel.

The expressions "spaced" and "spacing" are intended to refer to the relative position of weft tows along the warp direction of the preform (corresponding to the longitudinal and circumferential directions as discussed above) and does not imply a gap or void between such tows. It may be that adjacent weft tows are spaced apart by their respective widths such that there is substantially no gap between them. Accordingly, the spacing may refer to the distance along the warp direction between a centreline of each weft tow (or an upstream or downstream edge of the tow relative to the direction of movement). The expansion of the weft tow spacing as described herein occurs as the woven preform is drawn from the loom and onto the mandrel, and so it is referred to herein as preform expansion of the weft tow spacing. It will be appreciated that such expansion in the formed and cured component would not occur to any appreciable extent.

FIG. 2 is a simplified drawing in which the weft tow expansion is apparent by comparing the configuration of the weft tows 202 as received on the mandrel with the configuration of the weft tows 202 along the guide 130 (where they appear parallel in the drawing). However, this is merely a simplified drawing and the inventors have determined that the weft tow expansion occurs throughout the path from the loom to the mandrel. The associated mechanism driving the weft tow expansion is considered to be the warp tows being drawn at different speeds, in particular with warp tows associated with relatively outward radial locations (i.e. in the flange portion) being drawn at relatively faster rates than warp tows associated with the relative inward radial locations (i.e. the base region), Once the weft tows are woven between the warp tows at the loom, they generally remain in fixed relationship with the respective parts of the warp tows, and so the weft tow spacing increases along this path as the warp tows are drawn at different rates.

In view of the mechanism discussed above, it is considered that the action of weft tow expansion occurs between the loom and the mandrel and ceases for a respective portion of the woven preform once that portion is received onto the mandrel.

A profile of each weft tow is therefore considered to change along the path from the loom to the mandrel, in correspondence with the profile of the rates at which the warp tows are drawn. For example, for a relatively simply profile having a radially-inner base region and radially outer flange, a weft tow having a relatively linear direction (corresponding to the lateral direction) at the loom may adopt a bowed profile by the time it reaches the mandrel, with the lateral parts of the weft tow being drawn relatively more forward (in the direction of application onto the mandrel). The disclosure envisages the weft tows being woven (i.e. applied) at the loom along non-linear directions, for example using a non-linear beating member of the loom which causes each weft tow once woven (e.g. by action of a shuttle passing through a shed formed by manipulation of the warp tows by the loom) to adopt the non-linear shape. For example, the loom may be configured and/or controlled to cause each weft tow to adopt a non-linear shape, such as a bowed shape, to offset relative movement of portions of the weft to along the path from the guide to the mandrel. For example, the non-linear shape may be selected and/or configured so that the weft tow becomes progressively more linear along the path between the loom and the mandrel and may be substantially aligned with a radially-extending plane upon reception at the mandrel (i.e. a plane extending through the rotation axis of the mandrel). Accordingly, the particular shape may be selected in dependence on a particular configuration of the loom mandrel, and the path between them.

While a weft tow profile which is substantially aligned with a radially-extending plane at the mandrel may be desirable to achieve a relatively regular woven structure with predictable structural performance, it is not considered to be essential and the disclosure envisages weft tows having a non-linear profile (i.e. not substantially aligned with a radial plane) on the mandrel or formed component. Further, it is also contemplated that weft tows may be woven at the loom with a non-linear shape which partially offsets the deformation that occurs along the path between the loom and the mandrel, for example to avoid the weft tows having an excessively bowed shape as applied on the mandrel.

In a woven preform, weft tow expansion may be permitted by extension of warp tows, or by relative movement of warp tows along the warp direction (e.g. owing to different rates at which the tows are drawn). As is known in the art, different weaves (i.e. different weave patterns or designs) can be used to achieve different properties of a woven structure. For example, weaves with relatively more interlacing between warp and weft tows may generally be more stable and less compliant to adopt different shapes, whereas weaves with relatively less interlacing between warp and weft tows may generally be less stable and more compliant. Such interlacing tends to result in crimping of tows as they pass under or over the respective other tow, and each crimping location may increase a resistance to relative movement between tows (e.g. by elevated friction). As a simple example, "satin" weaves have a relatively high float number (the number of tows of one type over which a tow of the other type extends between interlacing or crimping locations) compared to some other weave types such as a plain weave. Such "satin" weaves therefore have a reduced stability and are more compliant, and are known in the textile industry to provide an improved drape (i.e. being compliant to conform easily to a shape). Similar concepts apply to more complex structural weaves, including multi-layer weaves. While the expression "stability" is used in the relevant art to refer to the compliance of a weave structure, for the purposes of this disclosure it may be considered to be interchangeable or equivalent to a stiffness or flexural rigidity (as may be assessed by reference to a flexural modulus or bending modulus of elasticity).

In a multi-layer weave, there are multiple layers of weft tows extending along a weft direction and layered in a thickness direction of the weave, with warp tows extending along a substantially orthogonal warp direction at respective locations along the weft direction. Each location along the weft direction occupied by one or more warp tows superposed on each other through the thickness direction is referred to herein and in the art as a "stack", such that there are a plurality of stacks defined along the weft direction by respective sets of one or more warp tows. A common configuration of stacks in a multi-layer weave is to provide an alternating arrangement of warp stacks and binding stacks, with binding stacks being stacks in which the or each warp tow is interlaced with weft tows (i.e. moving between layers of weft tows) to bind the weft tows, whereas warp stacks are stacks in which the or each warp tow extends without interlacing with weft tows (e.g. remaining between the same two layers of weft tows).

In order to permit preform expansion of the weft tow spacing, a design engineer may select a suitable weave that permits the tension applied on the woven preform as it is drawn onto the mandrel to result in the warp tows being drawn at variable rates. In particular, as described above it is desired that the greater circumferential dimensions at locations of the mandrel corresponding to radially outer parts of the flange will tend to draw the respective warp tows from the warp tow supply at relatively greater rates.

It is thought that, if the woven preform extending between the loom and the mandrel is highly stable and resistant to warp tows being conveyed at different rates, then the variable profile of the mandrel (i.e. having a variable radial dimension and therefore variable circumferential dimensions depending on the radial location) may cause a variable tension force on the woven preform as it is drawn onto the mandrel, which would increase as the woven preform continues to be drawn without yielding. This may cause wrinkling and other forming defects as the preform is drawn onto the mandrel.

In contrast, if the woven preform extending between the loom and the mandrel is less stable such that warp tows are permitted to be conveyed at different rates with substantially no resistance, then warp tows would be drawn at different rates corresponding to the variation of the circumferential dimension of the mandrel, with the tension force applied on the woven preform by rotation of the mandrel being substantially uniform.

The inventors understand that, between these two hypothetical scenarios, there is the realistic situation in which the weave of the woven preform has a stability such that it permits warp tows to be drawn at different rates but offers some resistance to this occurring (e.g. by the natural friction within the weave). Accordingly, it is thought that that an equilibrium develops whereby the resistance of the woven preform causes a variable tension to arise over the lateral extent of the preform, which in turn causes the warp tows to be drawn at different rates.

The above explanation of the tension forces and the effect on the drawing rates of the warp tows is provided as background for establishing some terminology that is useful for discussing further aspects of the disclosure and does not imply that it is a complex activity to select a weave that permits warp tows to be drawn at different rates for any given application.

The inventors have determined that there are advantages to providing an annular or semi-annular composite component in which the weave varies between (i) portions which do not tend to experience variable drawing rates of warp tows or preform expansion of weft tow spacing; and (ii) portions which do tend to experience such variable drawing rates of warp tows or preform expansion of weft tow spacing. In the example of an annular or semi-annular composite component having a base and a flange as described herein, the inventors have determined that there are advantages to providing a relatively more stable weave in the base region of the woven preform, and a relatively less stable weave in the flange region of the woven preform. Some of the associated advantages include that the structural integrity of the base can be maximized by using a more stable weave, while avoiding forming defects (such as wrinkling) in the flange.

Figure 3:
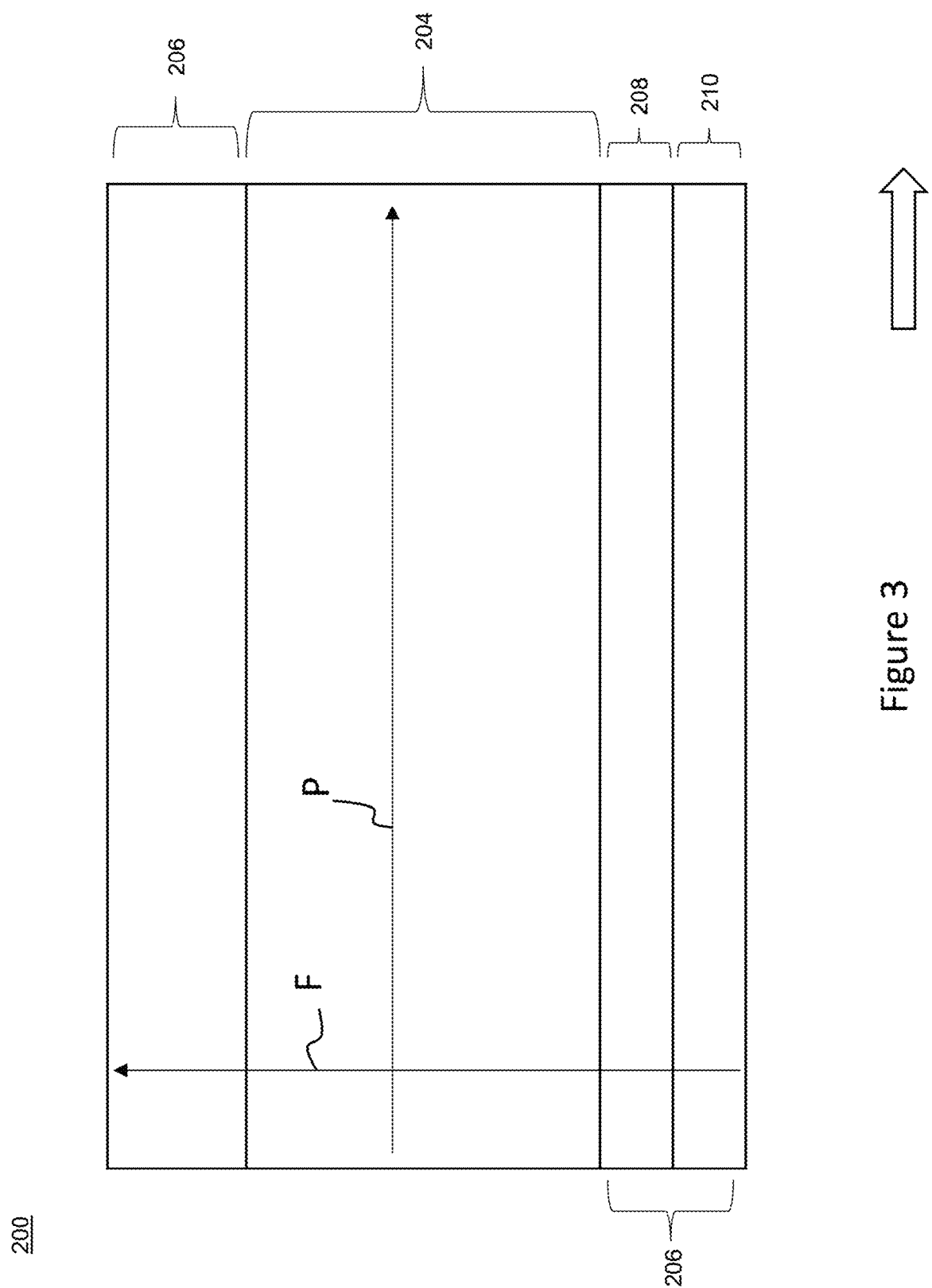
FIG. 3 schematically shows regions of an example woven structure.

FIG. 3 schematically shows a woven structure 200 having different weaves in a base region 204 and flange regions 206 respectively. It will be appreciated that the woven structure is implemented in a woven preform and maintained in a composite component comprising the woven structure and a matrix material, and as such the following description is with reference to a woven structure per se, rather than with reference to a particular stage of manufacture.

The woven structure 200 of FIG. 3 has an extent along a warp direction P which is also a longitudinal direction of the structure, and which corresponds to a direction along which a preform comprising the woven structure would be drawn during a manufacturing process (as indicated by the block arrow). The woven structure 200 has an orthogonal lateral direction F, which may generally correspond to a weft direction of the structure, although it will be appreciated that the weft direction may locally vary owing to variable expansion of weft tow expansion as described above and elsewhere herein.

In the example of FIG. 3, the structure 200 has a base region 204 corresponding to a base of an annular or semi-annular composite component, and two flange regions 206 extending from lateral edges of the base region, the flange regions 206 corresponding to flanges of the composite component.

The base region 204 has a first weave and the flange regions 206 have at least a second weave. In the example of FIG. 3, one of the flange regions 206 (the lower flange as drawn) is shown as comprising an inner flange region 208 and an outer flange region, with the inner flange region 208 having the second weave and the outer flange region 210 having a different third weave. Merely by way of example, the other flange region 206 (the upper flange as drawn) has the second weave throughout. This is for illustration only and it will be appreciated that in other examples opposing flange regions may have the same weaves as each other.

The first, second and third weaves differ from one another to ease preform expansion of weft tow spacing in the flange regions 206 relative to the base region 204, with the third weave differing from the second weave to further ease preform expansion in the outer flange region 210 relative to the inner flange region 208.

The weaves differ from each other by a weave property to make the weave for the flange (or outer region of the flange) less stable, for example to permit the weave to more readily permit different drawing rates of warp tow in response to a variable tension applied to the respective warp tows by rotation of the mandrel 150.

The weave property which varies may be any suitable weave property to have the effect. For example, the weave property may be selected from the group consisting of: a type of weave pattern; a type of multi-layer weave; a float number, corresponding to a number of weft tows over which binding warp tows float in the respective weave; a ratio of binding stacks to warp stacks in a multi-layer weave; a binding depth of binding warp tows in binding stacks of a multi-layer weave; a tow count of binding warp tows in binding stacks of a multi-layer weave; and a tow count of weft tows bound by warp tows in a multi-layer weave.

It is known in the art how different types of weave pattern lead to different stabilities. For example, variation of the type of weave pattern from a plain weave in the base region to a satin weave in the flange region would reduce stability and ease preform expansion of the weft tow spacing in the flange region relative to the base region.

A variation of a type of multi-layer weave may be a variation in a type of through-thickness weave pattern. For example, variation of the type of multi-layer weave (in binding stacks) from a layer-to-layer angle interlock (a term of the art) in the base region to a through-thickness angle interlock or through-thickness orthogonal interlock would reduce stability and ease preform expansion of the weft tow spacing in the flange region relative to the base region. A variation to a through-thickness angle interlock may further reduce stability and ease preform expansion of the weft tow spacing.

A variation of the float number (the number of weft tows over which binding warp tows float in the respective weave) would reduce stability and ease preform expansion. For example, moving from a float number of 4 to a float number of 8 would reduce stability and ease preform expansion. The float number may correspond to a two dimensional weave type, or a multi-layer weave type. In the case of a multi-layer weave type, the float number may relate to floating of a binding warp tows over weft tows in a through-thickness weave (e.g. an orthogonal through-thickness interlock), or may relate to floating of binding warp tows over weft tows in a layer-to-layer interlock weave. It will be appreciated that in such a layer-to-layer interlock weave, it is not required for the binding warp tows to move to a different weft tow layer after passing each weft tow, and instead it may extend past multiple such weft tows before moving to a different weft tow layer. The number of such weft tows past which it extends may be referred to as the float number, or as an embedded float number when the warp tow is not at an outer surface of the multi-layer weave.

A ratio of binding stacks to warp stacks may be varied to ease preform expansion of the weft tow spacing. In particular, binding stacks are inherently more stable and resistant to relative movement of the warp tows, since they introduce crimp locations and bind the various tows together. Accordingly, reducing the ratio of binding stacks to warp stacks would ease preform expansion of the weft tow spacing.

Similarly, a binding depth of binding warp tows in binding stacks of a multi-layer weave influences stability and the ease of preform expansion, with a greater depth tending to increase stability and a lower depth tending to reduce stability and so ease preform expansion of the weft tow spacing. For example, it may be that in a multi-layer weave having 8 layers of weft tows, binding warp tows extend throughout the thickness (i.e. an 8-layer depth) or less than the full thickness (e.g. a 4-layer thickness).

A number of binding tows (i.e. a tow count) in a binding stack also influences stability and the ease of preform expansion, with a greater number of binding tows tending to increase stability and a lower number of binding tows tending to reduce stability and so easing preform expansion of the weft tow spacing. For example, in a layer-to-layer angle interlock multi-layer leave through 8 layers of weft tows, the number of binding warp tows in a warp stack can be variable, for example there may be 6 binding warp tows or 4 binding warp tows.

Figure 4B:
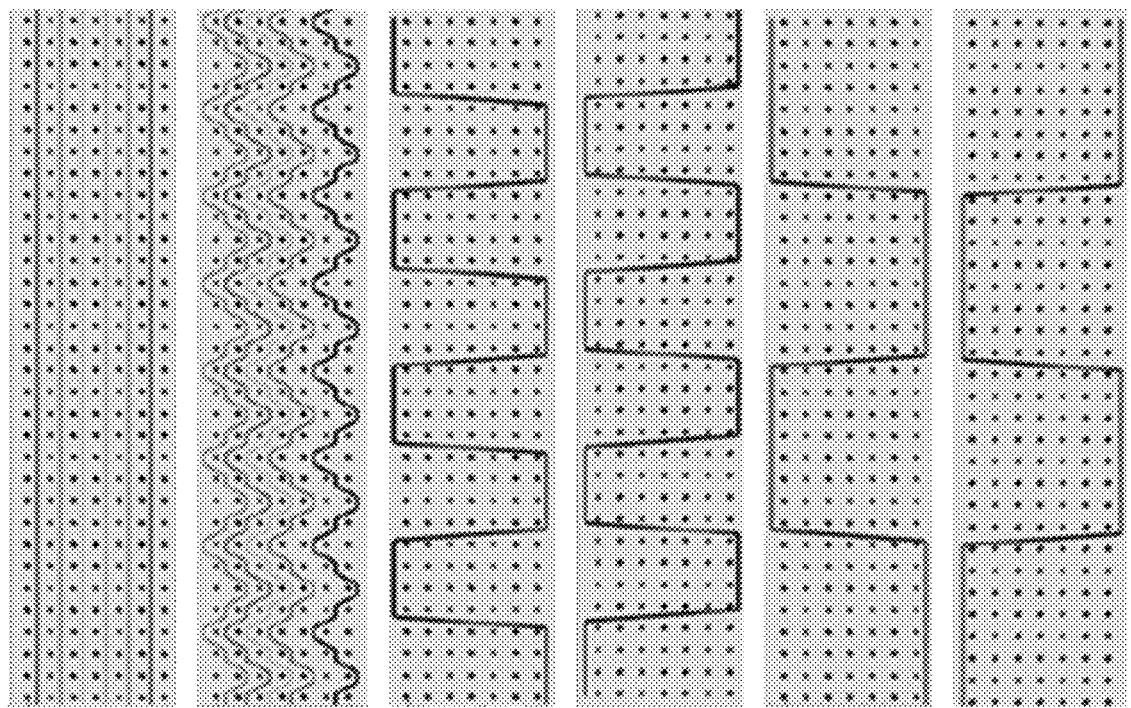
FIGS. 4A-4B schematically shows multi-layer weave types of an example woven structure.
Figure 4A:
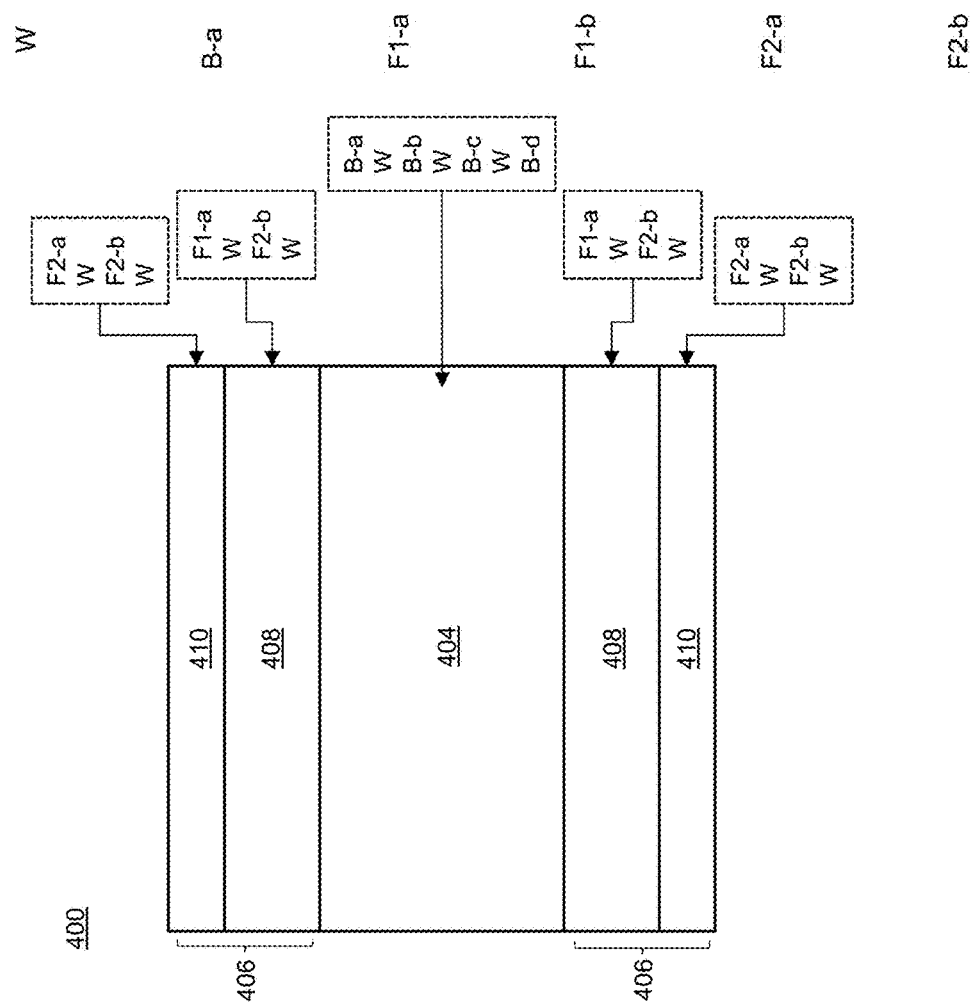

FIGS. 4A and 4B show a further example of a woven structure 400 for a woven preform and for a composite component formed from the woven preform. It is similar to the woven preform 300 as discussed above with respect to FIG. 3 but differs in that the flange regions 406 on each lateral side of the base region 404 are symmetrical: each having an inner flange region 408 having the second weave and an outer flange region 410 having the third weave. As described above, the base region 404 has a first weave, and the second weave differs to ease preform expansion of weft tow spacing in the flange region 406 relative to the base region. Further, the third weave differs from the second weave to further ease preform expansion of weft tow spacing in the outer flange region to ease preform expansion of weft tow spacing in the outer flange region 410 relative to the inner flange region 408.

FIG. 4A recites repeating sequences of alternating warp and binding stacks for each region. In particular, the base region 406 has an alternating sequence of binding stacks (prefix "B") and warp stacks ("W"), with the sequence cycling through four versions of the binding stacks (B-a to B-d). The inner flange regions 408 similarly have a repeating sequence of alternating warp and binding stacks, with the binding stacks cycling between two versions (F1-a, F1-b). The outer flange regions 410 similarly have a repeating sequence of alternating warp and binding stacks, with the binding stacks cycling between two versions (F2-a, F2-b).

FIG. 4B shows a multi-layer weave stack pattern for each of the respective stacks, showing seven layers of weft tows in cross-section (i.e. with the plan of the structure extending through the weft tows). The stack pattern annotated "W" is the warp stack, which simply shows six warp tows individually extending along the warp direction between respective layers of weft tows, without interlacing between the weft tow layers. In this example, all warp stacks in the respective regions have this pattern.

The stack pattern annotated "B-a" corresponds to the binding stacks of the base region. It shows a layer-to-layer angle interlock structure for 6 binding warp tows through the seven layers of weft tows. Each of the binding stacks of the base region from B-a through to B-d have this pattern, each being longitudinally offset by one weft tow. Accordingly, stack patterns for stacks B-b to B-d are not shown.

The stack patterns F1-a and F1-b correspond to the binding stacks of the inner flange regions 408. They each show an orthogonal through-thickness interlock having a float number of four (four weft tows). This may be referred to as a "four-up, four-down" stack pattern. The stack patterns F1-a and F1-b are longitudinally offset relative to one another by four weft tows.

The stack patterns F2-a and F2-b correspond to the binding stacks of the outer flange regions 410. They each show an orthogonal through-thickness interlock having a float number of eight (eight weft tows). This may be referred to as an "eight-up, eight-down" stack pattern. The stack patterns F2-a and F2-b are longitudinally offset relative to one another by eight weft tows.

Figure 5:
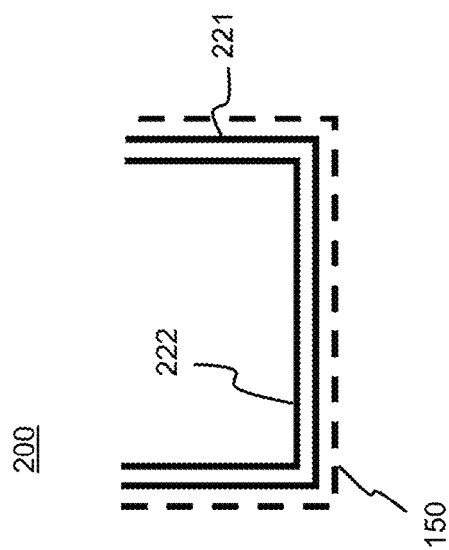
FIG. 5 is a flow diagram of a method of manufacturing a composite component.

FIG. 5 is a cross-sectional view of a woven structure 200 as applied on a mandrel, with the woven structure being substantially as described above with respect to FIGS. 1-2 and 3 or 4, and the mandrel being as described above with respect to FIG. 1. As shown in FIG. 5, the woven structure 200 has two layers superposed on each other, including a first layer 221 applied to the near net shape profile of the mandrel 150, and a second layer 222 applied onto the first layer 221.

The multiple layers may be applied by a continuous rotation and application of the woven structure 200 to the mandrel, to build up layers in a spiral pattern. Otherwise, successive layers may be applied separately, for example by cutting the woven preform and re-starting its application to the mandrel for the next successive layer.

Each layer may have a similar configuration of flange and base regions as described herein. In some examples, a tow weight for warp and/or weft tows may be increased for radially-outer layers in a multi-layer woven structure, to maintain a desired volume fraction of fibre reinforcement material in the resulting composite component.

To compensate for the decreasing lateral extent of the layers, successive layers may vary in various aspects. For example, a lateral dimension of the woven preform may vary between layers (e.g. to reduce for radially-outer layers). Further, a lateral location of a boundary between the flange portion and the base portion may vary.

As will be described below, such variations may be controlled by a controller of the loom, which may vary weave properties and dimensions for the woven structure, for example for respective layers of the woven structure as are eventually formed on the mandrel.

Similarly, whether in a multi-layer or single-layer woven structure, a tow weight of one or more warp tows in the flange/flange region may be increased relative to a tow weight of warp tows in the base/base region. This may be to offset the increased circumferential dimension at radially outer locations of the structure and to maintain a desired volume fraction of fibre reinforcement material in the resulting composite component.

As described above with respect to the examples of FIGS. 1-5, the loom 120 may be controlled by the loom controller 121 to perform the weave, with the loom controller adjusting properties of the weave between different regions of the woven structure (e.g. the base region and flange region(s) as described herein), and/or for different portions of the woven structure corresponding to respective layers of a multi-layer woven structure. The loom controller 121 may comprise a computer readable medium (for example a non-transitory computer readable medium) comprising instructions that, when executed by a processor of the controller, cause the loom to weave a woven structure as described herein and/or as described with respect to any of the examples.

A composite component comprising a woven structure as described herein may be provided by any suitable method, for example by a resin transfer moulding (RTM) process, in which a matrix material (such as an epoxy resin or any other suitable matrix material as are known in the art) is infused in the woven structure to provide a composite component of matrix material and fibre-reinforcement material. The RTM process may be performed on the mandrel 150, with a sealing structure being disposed over the woven structure 200 to retain the matrix material, and the RTM process being conducted at elevated pressure and temperature to cure the composite material. The component may be removed from the mandrel by dismantling one or both of the flange sides and sliding the component from the base surface. It will be appreciated that parts of the mandrel defining the base surface may also be separable from the mandrel to aid removal of the component.

Although examples have been described in which the base of the composite component or woven structure is circumferentially extending and shown in the drawings as substantially cylindrical, it is envisaged that the base may have a variable radial profile along the axial direction (i.e. relative to the rotation axis).

We claim:

1. An apparatus for manufacturing an annular or semi-annular composite component having a circumferentially-extending base and a flange, the apparatus comprising:
    a loom for weaving a woven preform of fibre reinforcement material for the composite component;
    a rotatable mandrel configured to receive and draw the woven preform through the loom for weaving;
    wherein the rotatable mandrel defines a near net shape profile for the composite component, including:
        a base surface extending circumferentially around a rotation axis of the mandrel for defining a radially inner surface of the base of the composite component;
        a flange surface for defining a surface of the flange of the composite component, the flange surface extending from an edge of the base surface along a direction having a radial component, such that a circumferential dimension of an angular portion of the near net shape profile increases along a radial extent of the flange surface; and
    a guide disposed between the loom and the rotatable mandrel, the guide defining a guide path therebetween for the woven preform, the guide being configured relative to the loom and the rotatable mandrel to engage a first side of the woven preform opposite to a second side to be received on the near net shape profile of the rotatable mandrel;
    wherein the guide is configured so that a woven preform drawn by the rotatable mandrel along the guide path under tension engages the guide to transition to a flanged profile at a lip of the guide before being received on the mandrel.

2. The apparatus of claim 1, wherein the guide has a blended shape between a loom end and the lip at a mandrel end, the blended shape being configured so that the woven preform transitions from a planar profile towards the loom end to a flanged profile at the lip.

3. The apparatus of claim 1, wherein the lip has a profile corresponding to the near net shape profile defined by the rotatable mandrel.

4. The apparatus of claim 1, wherein the lip defines an L-shape for forming a composite component with a single flange on one edge of the base, or wherein the lip defines a U-shape for forming a composite component with flanges on each edge of the base.

5. The apparatus of claim 1, wherein there is a tangential path extending from the base surface of the rotatable mandrel to a corresponding base part of the lip of the guide, the tangential path being tangential relative to the base surface of the rotatable mandrel and extending from an application location of the rotatable mandrel for tangentially receiving a woven preform from the guide;
    wherein there is a shortest path from the loom to the application location;
    wherein the guide defines the guide path at a radially inward side of the shortest path relative to the rotation axis of the mandrel;
    wherein the lip of the guide comprises a flange part which departs from a profile of the base part along a direction having a radially outward component;
    whereby the apparatus is configured to draw a woven preform along the guide path so that a flange portion of the woven preform wraps around the flange part towards the shortest path to provide the woven preform with a flanged profile for application to the mandrel.

6. The apparatus of claim 1, comprising a warp tow supply configured to supply warp tows to the loom at different rates responsive to different rates at which the respective portions of the woven preform are drawn onto the rotating mandrel.

7. A method of manufacturing a preform for an annular or semi-annular composite component having a circumferentially-extending base and a flange using an apparatus of claim 1, the method comprising:
    rotating the mandrel to draw a woven preform through the loom as it is woven by the loom;
    wherein the woven preform transitions to a flanged profile corresponding to the near net shape profile of the rotatable mandrel as it passes over the guide under tension, prior to being received on the rotatable mandrel.

8. The method of claim 7, wherein the woven preform has a warp direction corresponding to the path along which it is drawn from the loom to the rotatable mandrel, and a lateral direction orthogonal to the warp direction and extending across the woven preform and generally parallel with the weft tows at the loom;
    wherein drawing the woven preform onto the rotatable mandrel causes a weft tow spacing between circumferentially-adjacent weft tows of the woven preform to vary along the lateral direction downstream of the loom, such that the weft tow spacing is greater at a first lateral portion of the woven preform corresponding to the flange surface of the rotatable mandrel than at a second lateral portion of the woven preform corresponding to the base surface of the rotatable mandrel.

* * * * *